United States Patent [19]
Hooker et al.

[11] Patent Number: 5,807,449
[45] Date of Patent: Sep. 15, 1998

[54] WORKPIECE TREATING APPARATUS AND METHOD OF TREATING SAME

[76] Inventors: Jeffrey A. Hooker, 405 Fifth Ave., Melbourne, Fla. 32951; James E. Spencer, Jr., 1042 Manigan Ave., Oviedo, Fla. 32765

[21] Appl. No.: 780,334

[22] Filed: Jan. 8, 1997

[51] Int. Cl.⁶ .................................................. B32B 31/00
[52] U.S. Cl. ........................... 156/64; 156/356; 156/357; 156/360; 156/350; 12/142 F; 118/680; 118/682; 364/559
[58] Field of Search .............................. 156/64, 350, 356, 156/357, 360; 12/142 F; 118/669, 679, 680, 682; 364/559

[56] References Cited

U.S. PATENT DOCUMENTS

| | | | |
|---|---|---|---|
| 4,379,731 | 4/1983 | Long et al. | 156/356 |
| 4,419,384 | 12/1983 | Kane et al. | 427/57 |
| 4,564,410 | 1/1986 | Clitheros et al. | 156/356 |
| 4,639,963 | 2/1987 | Fisher . | |
| 4,728,378 | 3/1988 | Bianchi | 156/64 |
| 4,866,802 | 9/1989 | Stein et al. . | |
| 4,951,338 | 8/1990 | Brown et al. . | |
| 5,094,538 | 3/1992 | Reedman et al. . | |
| 5,102,280 | 4/1992 | Poduje et al. . | |
| 5,110,615 | 5/1992 | Maiorca et al. . | |
| 5,131,753 | 7/1992 | Pine et al. . | |
| 5,131,754 | 7/1992 | Hasegawa . | |
| 5,136,974 | 8/1992 | Lisec | 118/673 |
| 5,177,563 | 1/1993 | Everett et al. . | |
| 5,181,079 | 1/1993 | Klinger . | |
| 5,196,900 | 3/1993 | Pettersen . | |
| 5,261,958 | 11/1993 | Davies . | |
| 5,271,953 | 12/1993 | Litteral | 427/8 |
| 5,280,436 | 1/1994 | Kubota et al. . | |
| 5,280,542 | 1/1994 | Ozeki et al. . | |
| 5,298,977 | 3/1994 | Shintani et al. . | |
| 5,329,351 | 7/1994 | Clementi . | |
| 5,331,406 | 7/1994 | Fishbaine et al. . | |
| 5,332,352 | 7/1994 | Poduje et al. . | |
| 5,379,106 | 1/1995 | Baldur . | |
| 5,383,118 | 1/1995 | Nguyen . | |
| 5,437,727 | 8/1995 | Yoneda et al. . | |
| 5,452,440 | 9/1995 | Salsburg . | |
| 5,452,447 | 9/1995 | Nelson et al. . | |

(List continued on next page.)

FOREIGN PATENT DOCUMENTS 5-337002  12/1993  Japan .................................... 12/142 F

OTHER PUBLICATIONS

Attached Information Disclosure Declaration of Jeffrey A. Hooker and James E. Spencer, Jr. (Including Exhibit A) regarding the experimental testing of system concepts. (1998).
"FN—Footwear News", vol. 51, No. 49, Dec. 1995.
"Footwear Business International", Mar. 1996.
"World Footwear", vol. 9, No. 6, Nov./Dec. 1995.
"American Shoemaking", vol. 369, No. 12, Dec. 1995.
"American Shoemaking", vol. 370, No. 2, Feb. 1996.
"American Shoemaking", vol. 370, No. 1, Jan. 1996.
"American Shoemaking", vol. 369, No. 9, 1996.

*Primary Examiner*—David A. Simmons
*Assistant Examiner*—Paul M. Rivard

[57] ABSTRACT

An apparatus and methods are provided for treating a workpiece such as a shoe component. The workpiece treating apparatus preferably includes a transporter for transporting a workpiece along a predetermined path of travel and a storage device for storing a plurality of predetermined parameters of each of a plurality of workpieces. A workpiece identifier is positioned responsive to the storage device for identifying the workpiece during travel along the predetermined path. A workpiece treatment applicator is positioned adjacent the transporter and responsive to the workpiece identifier for applying a treatment a workpiece being transported along the predetermined path of travel. A workpiece treatment position determiner preferably is positioned responsive to the workpiece identifier for continuously determining the position of the workpiece treatment applicator along a predetermined trajectory during treatment of the workpiece.

51 Claims, 3 Drawing Sheets

U.S. PATENT DOCUMENTS

| | | |
|---|---|---|
| 5,456,561 | 10/1995 | Poduje et al. . |
| 5,457,796 | 10/1995 | Thompson . |
| 5,463,463 | 10/1995 | Harvey et al. . |
| 5,465,350 | 11/1995 | Fueki . |
| 5,495,457 | 2/1996 | Takagi . |
| 5,506,682 | 4/1996 | Pryor . |
| 5,511,005 | 4/1996 | Abbe et al. . |
| 5,513,336 | 4/1996 | Vishlitzky . |
| 5,541,485 | 7/1996 | Teichmann et al. . |
| 5,550,998 | 8/1996 | Willis et al. . |
| 5,563,798 | 10/1996 | Berken et al. . |

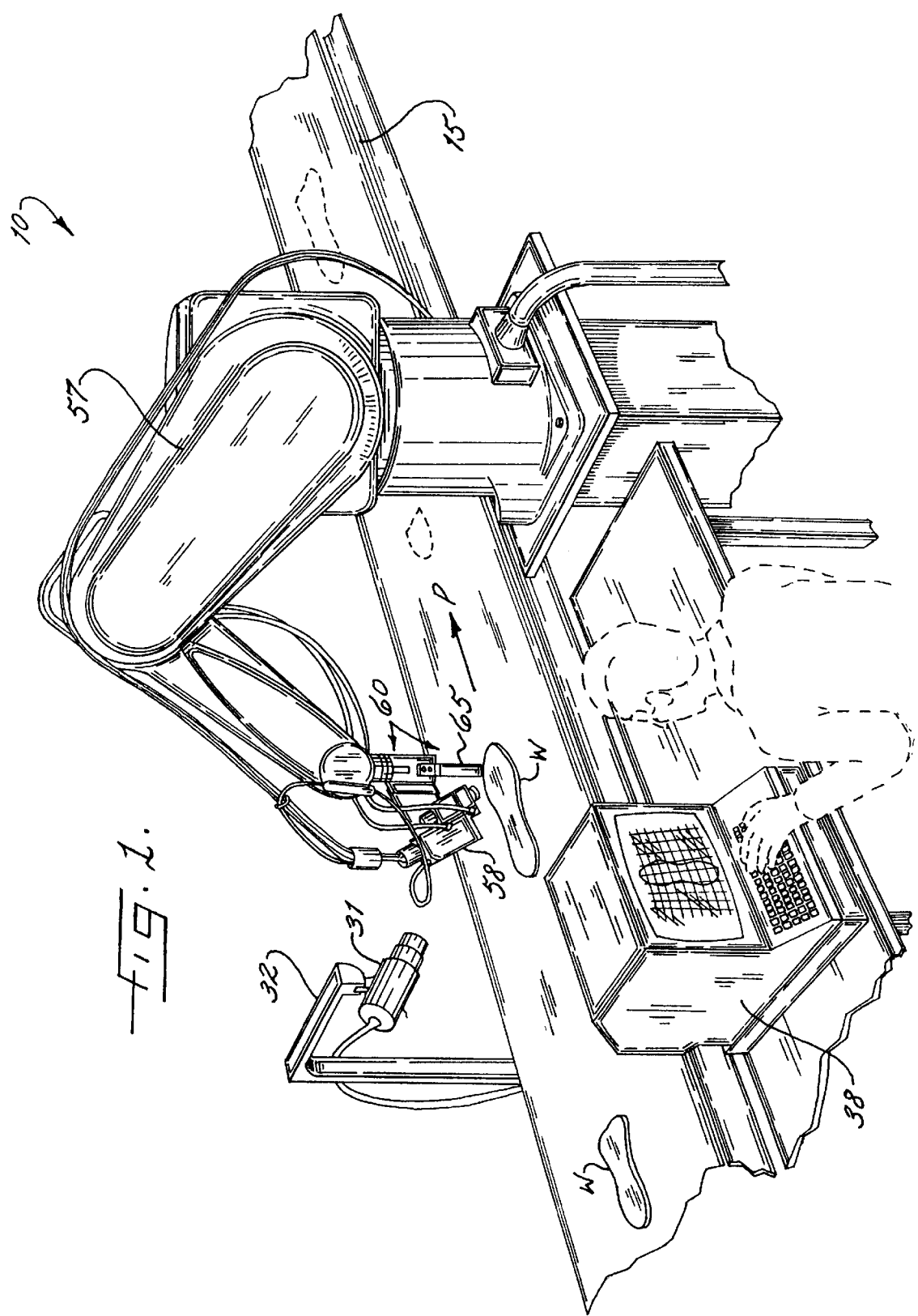

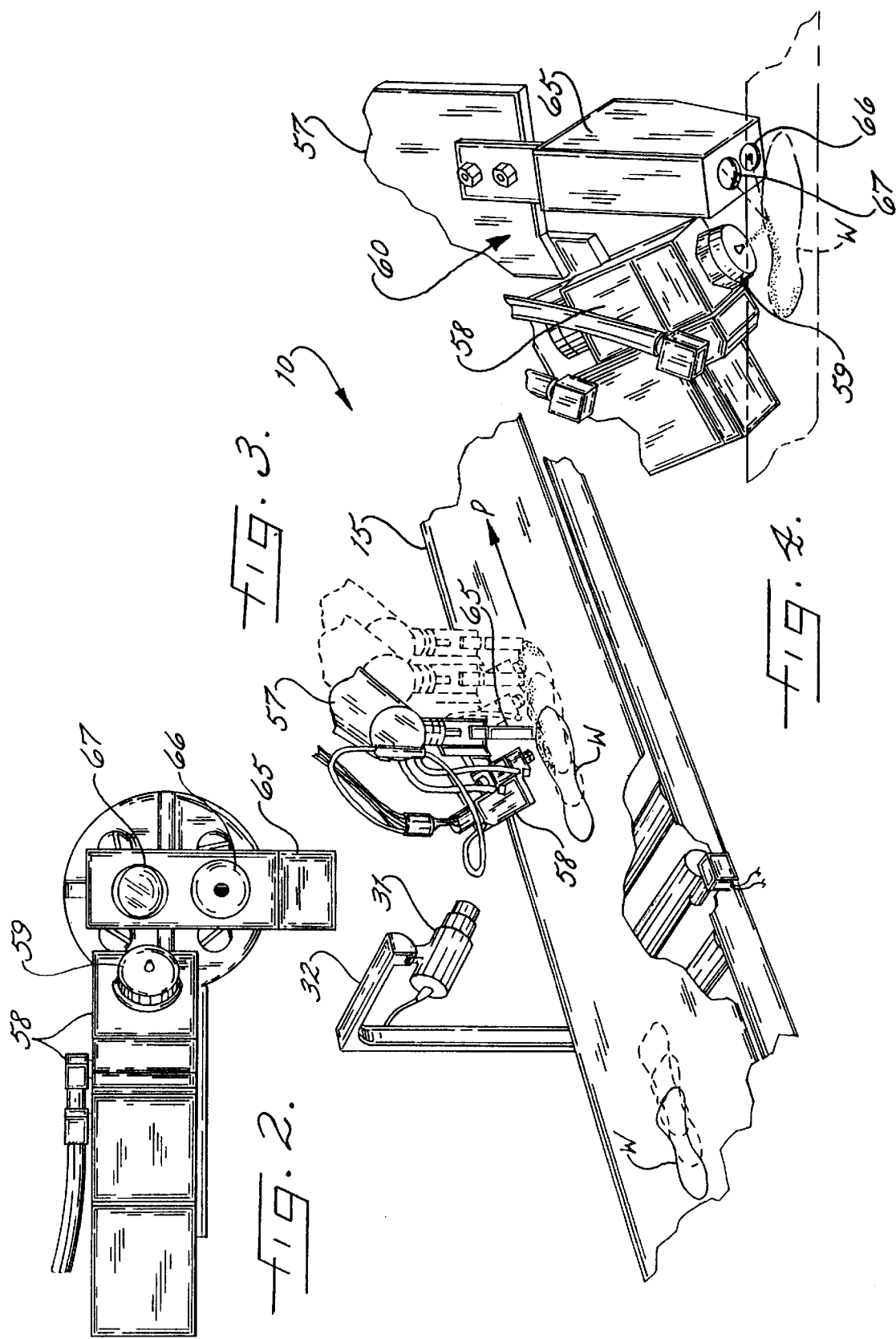

WORKPIECE TREATING APPARATUS AND METHOD OF TREATING SAME

FIELD OF THE INVENTION

The present invention relates to the field of product manufacturing and, more particularly, to the manufacturing of a plurality of products such as in an assembly operation.

BACKGROUND OF THE INVENTION

Over the years, a variety of systems have been developed for tracking and treating components of products during manufacture of the products such as in an assembly operation. These workpiece tracking and treating systems include, for example, component assembly, bonding, surface roughing, trimming, shaping, cutting, and adhesive applying in the shoe manufacturing process. Some examples of such systems in the shoe manufacturing industry can be seen in Japanese Patent Document 5-337002 by Reader et al. titled "*Bonding Method In Shoe Manufacturing Machine And Bonding Machine For Practicing The Method,*" U.S. Pat. No. 4,866,802 by Stein et al. titled "*Roughing Machine For Footwear (sic) Upper Assemblies And A System That Includes The Roughing Machine But Typically Includes As Well Other Machines Ahead Of And Following,*" and U.S. Pat. No. 5,261,958 by Davies titled "*Adhesive Applying Machine.*"

Additionally, workpiece tracking and treating systems have included cameras for identifying a workpiece, for determining the three dimensions of a workpiece, and for applying a treatment to a workpiece. These workpieces include not only shoe components, but also include, for example, circuit board components, various machine components, computer components, semiconductor components, automobile components, various containers, and tools. Examples of these systems can be seen in U.S. Pat. No. 5,506,682 by Pryor titled "*Robot Vision Using Targets,*" U.S. Pat. No. 5,280,436 by Kubota et al. titled "*Method For Measuring Three-Dimensional Position Of Object To Be Captured And Method For Capturing The Object,*" U.S. Pat. No. 5,280,542 by Ozeki et al. "*XYZ Coordinates Measuring System,*" and U.S. Pat. No. 5,110,615 by Maiorca et al. titled "*Method For Dispensing Viscous Materials A Constant Height Above A Workpiece Surface.*"

Despite the advancement of these systems over the years, much of the focus of these advancements have been on more sophisticated imaging systems such as using high speed processing for cameras and developing complex XYZ coordinates for identifying the unit being tracked, flaws in the unit being tracked, or locating a portion of the unit being tracked for assembly or other purposes such as in a production process. Nevertheless, these systems fail to provide a simplified and effective control of the treatment of the units or workpieces upon which a desired operation is to be accomplished.

Further, for a variety of reasons, the shoe industry has been hesitant to adopt systems for tracking and controlling shoe components. A portion of this hesitance can be attributable to the custom nature of shoes in general. Shoes, for example, are manufactured in a variety of sizes and shapes. Like various clothing fashions, shoe styles change rapidly throughout the year, and shoe manufacturers must quickly adapt to these new styles and trends or else risk losing significant market share.

SUMMARY OF THE INVENTION

With the foregoing in mind, the present invention advantageously provides an apparatus and methods which more effectively control the treatment process of a workpiece. The present invention also advantageously provide a simplified or less complex apparatus and methods for treating various workpieces. An apparatus and methods for treating a workpiece is particularly applicable, for example, to treating the surface and/or peripheries of a shoe component such as an outsole, a midsole, an insole, or an upper during a production or assembly process. The apparatus and methods of the present invention advantageously allow manufacturers to change, update, and adapt the treatment of various workpieces such as shoe component to changing trends in the marketplace for the applicable industry.

More particularly, the workpiece treating apparatus according to the present invention preferably has workpiece identifying means for identifying a workpiece and workpiece treating means responsive to the workpiece identifying means for treating a workpiece. Workpiece treatment position determining means is positioned responsive to the workpiece identifying means for determining the position of the workpiece treating means along a predetermined trajectory during treatment of the workpiece. Because the present invention advantageously provides an apparatus having the combination of the workpiece identifying means, workpiece treatment means, and workpiece treatment position determining means, the apparatus and methods provide improved control over the treatment of workpieces such as during manufacturing processes, especially during high precision operations such as application of an adhesive to various shoe components.

The apparatus preferably also includes transporting means for transporting a workpiece along a predetermined path of travel such as to and through a surface treatment work area. The workpiece, for example, can be transported into the field of vision of the camera system which preferably includes a vision processor. Data storing means is preferably positioned responsive to the vision processor for storing a plurality of predetermined parameters of each of a plurality of workpieces. The workpiece can be identified, e.g., size and type, responsive to the camera system and the data storing means. The vision processor also preferably determines the orientation and position of the workpiece, e.g., in the X-Y plane, relative to a predetermined coordinate system from which the vision processor and the workpiece treatment means are based.

A workpiece treating means of an apparatus for treating a workpiece according to the present invention preferably includes a workpiece treatment applicator for applying a treatment to a workpiece and a workpiece treating controller connected to the workpiece treatment applicator for controlling the application of the treatment to the workpiece by the workpiece treatment applicator. The workpiece treating controller preferably includes trajectory determining means for determining a treatment trajectory for the workpiece treatment applicator to thereby apply the workpiece treatment to the workpiece along the determined trajectory. The workpiece treatment position determining means, e.g., an optical sensor, preferably is positioned responsive to the workpiece treatment applicator and the workpiece treatment controller for continuously determining the position, e.g., Z-plane or Z-component data, of the workpiece treatment applicator along the predetermined trajectory during the application of the treatment of the workpiece. Additionally, the workpiece treating means can advantageously include a motion controller responsive to the transporting means for controlling the movement of the workpiece treating means so that it corresponds to the travel of the workpiece along the predetermined path.

The present invention also advantageously includes methods of treating a workpiece. A method according to the present invention preferably includes transporting a workpiece along a predetermined path of travel, identifying the workpiece during travel along the predetermined path, treating the workpiece being transported along the predetermined path of travel, and continuously determining the position of a workpiece treatment applicator along a predetermined trajectory during treatment of the workpiece.

Another method of treating a workpiece according to the present invention preferably includes identifying the workpiece during travel along a predetermined path, treating the workpiece being transported along the predetermined path of travel, and continuously monitoring the position of a workpiece treatment applicator along a predetermined trajectory during treatment of the workpiece.

An additional method of treating a workpiece according to the present invention preferably includes applying a treatment to a workpiece by the use of a workpiece treatment applicator, controlling the application of the treatment to the workpiece by the workpiece treatment applicator, and continuously determining the position of the workpiece treatment applicator along a predetermined trajectory during the application of the treatment of the workpiece.

Still another method of treating a workpiece such as a shoe component according to the present invention is provided which preferably includes identifying the shoe component responsive to a database of a plurality of shoe components, applying an adhesive to a surface of the shoe component being transported along a predetermined path of travel, and continuously monitoring the position of an adhesive applicator along a predetermined trajectory during application of an adhesive to the shoe component.

The present invention therefore advantageously provides an apparatus and methods for applying a treatment to a variety of workpieces of different sizes and geometries without the necessity of fixturing or securing the workpiece or without the necessity of modifying the apparatus. The apparatus advantageously continuously monitors the workpiece during travel and the workpiece treatment applicator so that accurate and smooth operational treatment of the workpiece is accomplished. The apparatus also advantageously provides a real-time type system for controlling and precisely applying a treatment, e.g., roughing, trimming, adhesive applying, to various customize workpieces such as used in the shoe industry, as well as other industries. The apparatus and methods advantageously can take into account the unique shape, size, and configuration or geometry of each workpiece and perform a desired treatment function to the workpiece.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is an environmental view of a workpiece treating apparatus according to an embodiment of the present invention;

FIG. 2 is a fragmentary bottom plan view of a workpiece treatment applicator of a workpiece treating apparatus according to an embodiment of the present invention;

FIG. 3 is a fragmentary perspective view of a workpiece treating apparatus illustrating transporting of a workpiece along a path of travel according to an embodiment of the present invention;

FIG. 4 is an enlarged and fragmentary perspective view of a workpiece treatment applicator of a workpiece treating apparatus according to the present invention.

DETAILED DESCRIPTION

Figure 5:
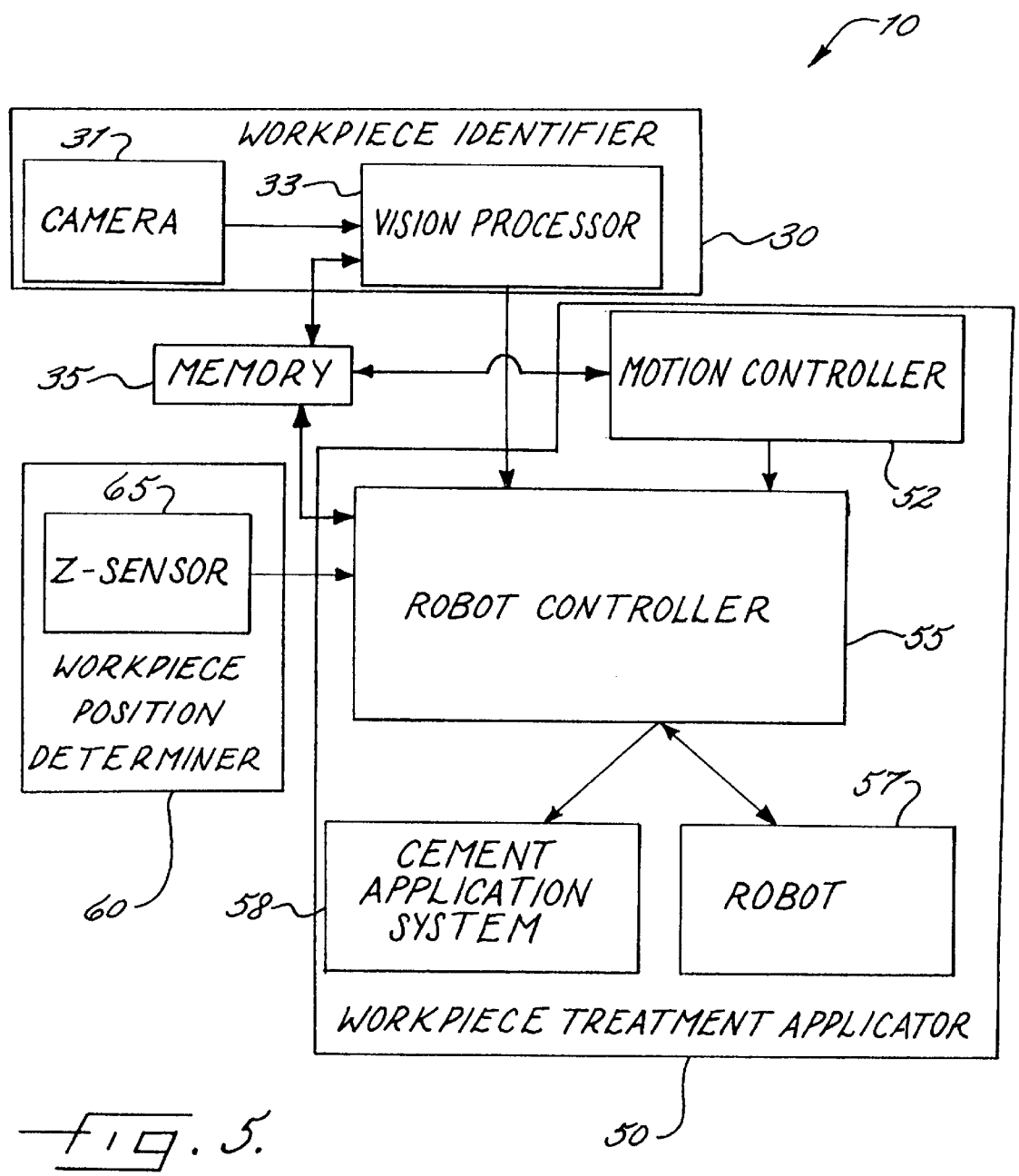
FIG. 5 is a schematic view of a workpiece treating apparatus according to the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

FIG. 1 illustrates an apparatus 10 and methods for treating a workpiece W which for illustrative purposes is the surface or peripheries of a shoe component, e.g., an outsole, a midsole, an insole, or an upper, during a production or assembly process. The apparatus 10 is particularly applicable, for example, to treating the surface or peripheries of shoe components because it advantageously allows manufacturers to change, update, and adapt the treatment of various sizes, shapes, or geometries of shoe components to changing trends in the marketplace. The apparatus 10 of this embodiment preferably is for applying adhesive or cement to components of a shoe, e.g., an athletic shoe, during the manufacturing process.

Outsoles and midsoles of athletic shoes, for example, can have various configurations or geometries which can be quite difficult to accurately or precisely to apply adhesive thereto. As described further herein, the apparatus 10 advantageously continuously monitors both the shoe component W during travel and a shoe component treatment applicator 58 so that accurate and smooth operational treatment of the shoe component W is accomplished. The apparatus 10 also advantageously provides a real-time type system for controlling and precisely applying a treatment, e.g., roughing, trimming, cutting, shaping, adhesive applying, to various customize workpieces W such as used in the shoe industry, as well as other industries.

As illustrated in FIGS. 1 and 3, the workpiece treating apparatus 10 for treating a workpiece W preferably has transporting means 15, e.g., a transporter, for transporting a workpiece W along a predetermined path of travel P. Data storing means 35, e.g., a storage device, preferably is positioned for storing a plurality of predetermined parameters of each of a plurality of workpieces W. As best illustrated in FIG. 3, the transporter 15 preferably is a conveyor or workpiece conveying system such as illustrated. For example, the conveying system 15 can include a frame, a plurality of spaced-apart rolls rotatably mounted to the frame, and a conveyor belt extending across the rolls. A conveyor drive, e.g., a motor, preferably drives the conveyor belt across the rolls in the desired path of travel P at a desired speed.

The storage device 35 preferably is memory device or circuit that stores data preferably in a database type format that can readily be updated, changed, or modified by a user of the apparatus 10. The storage device 35 can be a separate memory device or, as understood by those skilled in the art can be a memory of a portion of other elements of the apparatus 10 of the present invention (see FIG. 5).

Workpiece identifying means 30, e.g., a workpiece identifier, is positioned responsive to the data storing means 35 for identifying the workpiece W during travel along the predetermined path P. Workpiece treating means 50 is positioned adjacent the transporting means 15 and responsive to thee workpiece identifying means 30 for treating a workpiece W being transported along the predetermined path of travel. Workpiece treatment position determining means 60, e.g., a workpiece treatment position determiner, is positioned responsive to the workpiece identifying means 30 for continuously determining the position of the workpiece treating means 50 along a predetermined trajectory during treatment of the workpiece W.

More particularly, the workpiece identifying means 30 preferably includes an imaging collector such as a video camera 31 mounted to a mounting arm 32 overlying the conveyor 15 and positioned, e.g., at a predetermined angle or on a movable track, to capture a visual image of a workpiece W such as a shoe component being transported by the conveyor 15. A vision processor 33 is preferably positioned responsive to the camera 31 for processing data representative of the visual image of the workpiece W. The vision processor 33 can also be positioned responsive to the data storing means 35 for comparing the visual image data to the plurality of predetermined parameters of at least one of the plurality of workpieces W stored in the data storage means 35.

The vision processor 33 preferably is a processing circuit, a microprocessor, or a plurality of processors, as understood by those skilled in the art, and includes workpiece position identifying means 36, e.g., a workpiece position identifier, for identifying the orientational position of the workpiece W being transported along the predetermined path of travel by the conveyor 15. A user interface 38, e.g., a display such as a cathode ray tube, a liquid crystal display, or light emitting diode display and a keyboard or keypad, preferably is connected to the vision processor 33 for providing a visual image of the workpiece W to a user of the apparatus 10.

The workpiece treating means 50 preferably has a transport position processor 52, e.g., a motion controller, positioned responsive to the transporting means 15 for processing data representative of the position of the workpiece W being transported along the predetermined path of travel P. The motion controller 52 can include an optical encoder mounted to the conveyor 15 and a microprocessor for processing data representative of the movement of the conveyor 15 over time.

A workpiece treating controller 55, e.g., a robot controller, is also preferably included in the workpiece treating means 50 and preferably is positioned responsive to the transport position processor 52, the workpiece identifying means 30, and the workpiece treatment position determining means 60 for controlling the treatment of the workpiece W. A workpiece treatment applicator 58 is positioned responsive to the workpiece treating controller 55 for applying a workpiece treatment to the workpiece W. The workpiece treating controller 55 advantageously includes trajectory determining means 56, e.g., a trajectory determiner, positioned responsive to the workpiece identifying means 30 for determining a treatment trajectory for the workpiece treatment applicator 58 to thereby apply the workpiece treatment to the workpiece W along the determined trajectory.

As best illustrated in FIGS. 1 and 5, the workpiece treatment applicator 58, e.g., a cement application system, preferably is connected to a robot 57 as understood by those skilled in the art. The robot 57 includes a main body and an arm which connects to the main body and extends outwardly therefrom. As understood by those skilled in the art, the arm advantageously can move inwardly, outwardly, upwardly, and downwardly and can pivot and/or rotate to a desired position responsive to the robot controller 55. The robot 57 is also connected to the robot controller 55 which controls both the movement of the robot in the X, Y, and Z planes and the application of the treatment by the applicator 58 to a workpiece, e.g., a shoe component, to which application of a treatment such as applying cement, roughing, or trimming is desired. The robot 57, for example, preferably moves the applicator head 59 so as to overlie the shoe component W at a desired distance from the surface of the component or in contact therewith. The robot 57 can then be moved downstream simultaneous with or synchronous with the movement of the conveyor 15 for more accurately applying a treatment along a desired trajectory.

As best illustrated in FIGS. 2 and 4-5, the workpiece treatment position determining means 60 preferably includes an optical sensor 65, e.g., a Z-sensor, connected to the workpiece treating means 50 and positioned to sense optical data from the workpiece W being transported by the transporting means 15. The optical sensor 65 preferably combines a light emitter 66 such as a laser emitter and an optical detector 67, e.g., an optical receiver or other optical transducer, positioned closely adjacent each other and positioned closely adjacent the head 59 of the applicator 58. Although the optical sensor 65 is preferably a laser emitter and optical receiver, as understood by those skilled in the art other optical transceiver sensors 65, such as light emitting diode, can be used as well according to the present invention. The optical sensor 65 also includes associated drive electronics for driving the laser emitter 66 and detecting electronics for detecting optical data received by the optical detector 67 as understood by those skilled in the art.

Because the optical sensor 65 preferably is positioned closely adjacent the applicator head 59 of the applicator 58 reflectance or other light or darkness detection techniques can be used as understood by those skilled in the art. The sensor 65 can sense or track the application of a stream or bead of adhesive, can sense a change in contour, e.g., edges, recesses, inclines, or can sense detection of variation in shades of light, e.g., shadows, to adaptively and accurately move the applicator head 58 to the desired location. The optical sensor 65 thereby advantageously provides optical data, e.g., a position feedback device for real-time location, to the robotic controller 55 for the positional location, i.e., a Z-dimension or Z-plane data, of the head 59 of the applicator 58 during a treatment process. This allows the controller 55 to continuously modify or update the actual position of the head 58 with the desired position of the head 58 based upon the determined trajectory for the treatment.

The optical sensor 65 in combination with the imaging system, e.g., camera 31, also advantageously provides a depth of field sensing system so that the applicator head 58 can be positioned at a predetermined distance from the surface of the workpiece W, trace peripheries of a workpiece W, and/or continuously be positioned a predetermined distance from an edge of a workpiece for precise application of a treatment to the surface of the workpiece, e.g., applying adhesive. In the shoe manufacturing industry, for example, this can provide reduced adhesive as well as shoe component waste and reduced errors or reworks. Because the shoe styles and types change rapidly, much of the shoe manufacturing work is conventionally labor intensive. Therefore, the apparatus 10 can advantageously reduce labor costs by automating processes which were otherwise performed by several laborers.

In operation, and as illustrated in FIGS. 1-5, a plurality of workpieces W, e.g., shoe components, are individually placed onto the moving transporting means 15 by a person or by a loading device. The transporting means 15 then transports the workpieces W to and through a surface treatment work area. A workpiece W is then transported into the field of vision of the camera 31, and the vision processor 33 can identify the size, shape, and type of workpiece W responsive to the camera 31 and the stored workpiece data in the data storing means 35. The vision processor 33 also preferably determines the orientation and position of the workpiece W in the X-Y plane relative to a predetermined coordinate system from which the vision processor 33 and the workpiece treatment controller 55 are based. The coordinate system is preferably displayed on the user interface 38 to the user so that effective tracking or monitoring of the workpiece W by a system user can occur.

After the workpiece W is located, the vision processor 33 determines a plurality of data points representative of the perimeter of the workpiece W and, if desired or required, also representative of interior portions of the workpiece W. According to the apparatus 10 of the present invention, however, this step does not have to occur after identifying the workpiece W. In other words, the apparatus 10 advantageously can determine points around the perimeter of an unknown workpiece W and perform a function on the unknown workpiece based upon these determined plurality of data points of the perimeter of the workpiece W.

The vision processor 33 communicates these plurality of points to the workpiece treatment or robotic controller 55. The workpiece treatment controller 55 calculates an interpolation or trajectory responsive to these plurality of data points for treating the workpiece W, e.g., applying adhesive, roughing the surface, cutting, or trimming the workpiece W, responsive to the plurality of points to create a smooth trajectory path around and within the workpiece W.

For example, to accomplish this initial calculation or determination by the vision processor 33, once the workpiece W is located the center of mass of the workpiece W is calculated. A principal axis of orientation is determined and an X-Y coordinate system is attached or established for the workpiece W. Because the workpiece W is recognized in a two-dimensional plane by image or light contrast techniques as understood by those skilled in the art, the center of mass will be as if the workpiece W were flat. The part can then be compared at that time, if desired, to determine if it corresponds with a known workpiece in a database. Preferably, however, a plurality of edge points, e.g., a plurality of data points around the perimeter, are located for the workpiece W. Also, if the workpiece W has one or more openings or holes therein, then a plurality of edge points around the opening(s) are also located. These plurality of edge points are then converted or referenced to a real or actual coordinate system of the workpiece environment and system. This data, e.g., workpiece identity and plurality of perimeter or edge data points, can then be communicated to the workpiece treatment controller 55.

Once the workpiece treatment controller 55 receives this data, for example, the data representative of the plurality of edge points can be used to calculate a desired trajectory. This desired trajectory advantageously can also be modified or added to through the user interface 38 by a system user. This modification through the user interface 38 can allow workpieces W having unique or different shapes to also be readily handled for the desired function, e.g., adhesive applying, cutting, trimming, etc., by the apparatus 10. The workpiece treatment controller 55 preferably also monitors the movement of the transporting means 15 so that the calculated trajectory to accomplish a desired function, e.g., application of adhesive, can be effectively executed during the movement of the transporting means 15 (e.g., a continuous and smooth production process).

After all of the calculations are completed, the workpiece treatment controller 55 moves the workpiece treatment applicator 58 by use of the robot so that the workpiece treatment head 59, e.g., a distal end portion, of the workpiece treatment applicator 58 overlies the workpiece W being located, tracked, and/or inspected. The optical sensor 65 then provides data to the workpiece treatment controller 55 related to the position of the head 59 relative to the workpiece W (i.e., a Z-axis or component) for a preselected workpiece treatment, e.g., application of an adhesive. The workpiece treatment is then applied to the desired area of the workpiece W.

The optical sensor 65 preferably is selected base upon desired optical characteristics of the optical sensor 65 which accomplishes a desired workpiece treatment function. For example, the optical sensor 65 used preferably provides a desired output, i.e., about zero, when the sensor 65 is at a predetermined distance from the surface of the workpiece W. The robot, in effect, initially moves the workpiece treatment applicator 58, and the optical sensor 65 positioned adjacent thereto, downward toward the surface of the workpiece W until the output of the sensor 65 is zero. No predetermined presumptions of a third dimension, e.g., height, depth, or up-and-down motion of the workpiece treatment applicator 58, are made prior to use of the optical sensor 65. When this downward movement of the workpiece treatment applicator 58 occurs, the predetermined trajectory is initiated such as following the perimeter of an outsole of a shoe for applying an adhesive material in smooth pattern and a predetermined distance from the outer peripheries or edges of the outsole. The optical sensor 65 thereby provides a Z-component or Z-plane data for applying the adhesive. By monitoring the output of the optical sensor 65 so as to maintain the output close to or at zero, the workpiece treatment applicator 58 can be accurately maintained at the desired working distance for applying the adhesive material. This working distance can be set based upon the geometry and optics of the optical sensor 65 to meet the desired treatment function or application. In effect, the optical sensor 65 advantageously provides a continuous feedback of real time Z-component or Z-plane data, e.g., up and down motion, for the workpiece treatment applicator 58 of the apparatus 10.

During the workpiece treatment, the optical sensor 65 continuously monitors, and the workpiece treatment controller 55 responsively adjusts, the position of the applicator head 59, and the working distance and position of the applicator head 59 are continuously maintained. After completion of the calculated trajectory, the adhesive is no longer applied, and the workpiece treatment applicator 58 responsively returns to a neutral position to await the next workpiece W which can be an identical component traveling along the path of travel P or advantageously can be a different component have a different size, shape, or geometry.

As illustrated in FIGS. 1-5, and as described above, the present invention also includes method of treating workpieces W such a shoe components. A method according to the present invention preferably includes transporting a workpiece W along a predetermined path of travel P, identifying the workpiece W during travel along the predetermined path P, treating the workpiece W being transported along the predetermined path of travel P, and continuously determining the position of a workpiece treatment applicator 58 along a predetermined trajectory during treatment of the workpiece W.

The step of identifying the workpiece W preferably includes capturing a visual image of the workpiece W being transported, processing data representative of the visual image of the workpiece W, and comparing the visual image data to a plurality of predetermined parameters of at least one of a plurality of workpieces W. The processing step preferably includes identifying the orientational position of the workpiece W being transported along the predetermined path of travel P.

The step of determining the position of a workpiece applicator preferably includes sensing optical data from the workpiece W being transported. The step of treating the workpiece W includes processing data representative of the position of the workpiece W being transported along the predetermined path of travel P, controlling the treatment of the workpiece W, and applying a workpiece treatment to the workpiece W. The step of controlling the treatment of the workpiece W includes the step of determining a treatment trajectory for a workpiece treatment applicator 58 to thereby apply the workpiece treatment to the workpiece W along the determined trajectory.

Another method of treating a workpiece W according to the present invention preferably includes identifying the workpiece W during travel along a predetermined path P, treating the workpiece W being transported along the predetermined path of travel P, and continuously monitoring the position of a workpiece treatment applicator 58 along a predetermined trajectory during treatment of the workpiece W. The step of monitoring the position of a workpiece applicator 58 preferably includes sensing optical data from the workpiece W being transported and determining the position of the workpiece treatment applicator 58 during treatment of the workpiece W.

An additional method of treating a workpiece W according to the present invention preferably includes applying a treatment to a workpiece W by the use of a workpiece treatment applicator 58, controlling the application of the treatment to the workpiece W by the workpiece treatment applicator 58, and continuously determining the position of the workpiece treatment applicator 58 along a predetermined trajectory during the application of the treatment of the workpiece W. The controlling step preferably includes determining a treatment trajectory for the workpiece treatment applicator 58 to thereby apply the workpiece treatment to the workpiece W along the determined trajectory.

Still another method of treating a workpiece W such as a shoe component according to the present invention is provided which preferably includes identifying the shoe component responsive to a database 35 of a plurality of shoe components, applying an adhesive to a surface of the shoe component being transported along a predetermined path of travel P, and continuously monitoring the position of an adhesive applicator 58 along a predetermined trajectory during application of an adhesive to the shoe component. The shoe component can be located with an imaging collector such as a camera during travel along a predetermined path and inspected during travel along the predetermined path P. This method can also include the additional steps of the other various methods as described herein above.

In the drawings and specification, there have been disclosed a typical preferred embodiment of the invention, and although specific terms are employed, the terms are used in a descriptive sense only and not for purposes of limitation.

The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A workpiece treating apparatus for treating a workpiece, the workpiece treating apparatus comprising:
   transporting means for transporting a workpiece along a predetermined path of travel;
   workpiece identifying means for identifying at least parameters of the workpiece during travel along the predetermined path;
   workpiece treating means positioned adjacent said transporting means and responsive to said workpiece identifying means for treating a workpiece being transported along the predetermined path of travel; and
   workpiece treatment position determining means responsive to said workpiece identifying means for continuously determining the position of said workpiece treating means along a predetermined trajectory during treatment of the workpiece.

2. An apparatus as defined in claim 1, wherein said image collector of said workpiece identifying means comprises an imaging collector positioned to capture a visual image of a workpiece being transported by said transporting means, and wherein said workpiece identifying means further includes a processor responsive to said imaging collector for processing data representative of the image of the workpiece and comparing the image data to the plurality of predetermined parameters of at least one of the plurality of workpieces.

3. An apparatus as defined in claim 2, wherein said processor includes workpiece position identifying means for identifying the orientational position of the workpiece being transported along the predetermined path of travel by said transporting means.

4. An apparatus as defined in claim 1, wherein said workpiece treatment position determining means comprises an optical sensor connected to said workpiece treating means and positioned to sense optical data from the workpiece being transported by said transporting means.

5. An apparatus as defined in claim 1, wherein said workpiece treating means comprises a transport position processor responsive to said transporting means for processing data representative of the position of the workpiece being transported along the predetermined path of travel, a workpiece treating controller responsive to said transport position processor, said workpiece identifying means, and said workpiece treatment position determining means for controlling the treatment of the workpiece, and a workpiece treatment applicator responsive to said workpiece treating controller for applying a workpiece treatment to the workpiece.

6. An apparatus as defined in claim 5, wherein said workpiece treating controller includes trajectory determining means responsive to said workpiece identifying means for determining a treatment trajectory for said workpiece treatment applicator to thereby apply the workpiece treatment to the workpiece along the determined trajectory.

7. An apparatus as defined in claim 5, wherein said transporting means comprises a conveyor, and wherein the workpiece comprises a component of a shoe.

8. A workpiece treating apparatus for treating a workpiece, the workpiece treating apparatus comprising:
   a transporter for transporting a workpiece along a predetermined path of travel;

a storage device for storing a plurality of predetermined parameters of each of a plurality of workpieces;

a workpiece identifier responsive to said storage device for identifying the workpiece during travel along the predetermined path;

a workpiece treatment applicator positioned adjacent said transporter and responsive to said workpiece identifier for applying a treatment to a workpiece being transported along the predetermined path of travel; and a workpiece treatment position determiner responsive to said workpiece identifier for continuously determining the position of said workpiece treatment applicator along a predetermined trajectory during treatment of the workpiece.

9. An apparatus as defined in claim 8, wherein said workpiece identifier comprises a camera positioned to capture a visual image of a workpiece being transported by said transporter, a vision processor responsive to said camera for processing data representative of the visual image of the workpiece and comparing the visual image data to the plurality of predetermined parameters of at least one of the plurality of workpieces, and a user interface responsive to said vision processor for providing a visual image of the workpiece to a user thereof.

10. An apparatus as defined in claim 9, wherein said vision processor includes workpiece position identifier for identifying the orientational position of the workpiece being transported along the predetermined path of travel by said transporter.

11. An apparatus as defined in claim 10, wherein said workpiece treatment position determiner comprises an optical sensor connected to said workpiece treatment applicator and positioned to sense optical data from the workpiece being transported by said transporter.

12. An apparatus as defined in claim 11, further comprising a transport position processor responsive to said transporter for processing data representative of the position of the workpiece along the predetermined path of travel, and a workpiece treating controller responsive to said transport position processor, said workpiece identifier, and said workpiece treatment position determiner for controlling the treatment of the workpiece.

13. An apparatus as defined in claim 12, wherein said workpiece treating controller includes a trajectory determiner responsive to said workpiece identifier for determining a treatment trajectory for said workpiece treatment applicator to thereby apply the workpiece treatment to the workpiece along the determined trajectory.

14. An apparatus as defined in claim 13, wherein said transporter comprises a conveyor, and wherein the workpiece comprises a component of a shoe.

15. A workpiece treating apparatus for treating a workpiece, the workpiece treating apparatus comprising:

workpiece identifying means for identifying a workpiece;

workpiece treating means responsive to said workpiece identifying means for treating a workpiece; and workpiece treatment position determining means responsive to said workpiece identifying means for determining the position of said workpiece treating means along a predetermined trajectory during treatment of the workpiece.

16. An apparatus as defined in claim 15, wherein said workpiece identifying means comprises a camera positioned to capture a visual image of a workpiece, a vision processor responsive to said camera for processing data representative of the visual image of the workpiece and comparing the visual image data to a plurality of predetermined parameters of at least one workpiece.

17. An apparatus as defined in claim 16, wherein said vision processor includes workpiece position identifying means for identifying the orientational position of a workpiece.

18. An apparatus as defined in claim 17, wherein said workpiece treatment position determining means comprises an optical sensor connected to said workpiece treating means and positioned to sense optical data from the workpiece.

19. An apparatus as defined in claim 18, wherein said workpiece treating means includes a workpiece treating controller responsive to said workpiece identifying means and said workpiece treatment position determining means for controlling the treatment of the workpiece and a workpiece treatment applicator responsive to said workpiece treating controller for applying a workpiece treatment to the workpiece.

20. An apparatus as defined in claim 19, wherein said workpiece treating controller includes trajectory determining means responsive to said workpiece identifying means for determining a treatment trajectory for said workpiece treatment applicator to thereby apply the workpiece treatment to the workpiece along the determined trajectory.

21. A workpiece treating apparatus for treating a workpiece, the workpiece treating apparatus comprising:

a workpiece treatment applicator for applying a treatment to a workpiece;

a workpiece treating controller connected to said workpiece treatment applicator for controlling the application of the treatment to the workpiece by said workpiece treatment applicator; and workpiece treatment position determining means responsive to said workpiece treatment applicator and said workpiece treatment controller for continuously determining the position of said workpiece treatment applicator along a predetermined trajectory during the application of the treatment of the workpiece.

22. An apparatus as defined in claim 21, wherein said workpiece treatment position determining means comprises an optical sensor connected to said workpiece treating means and positioned to sense optical data from the workpiece.

23. An apparatus as defined in claim 22, wherein said workpiece treating controller includes trajectory determining means for determining a treatment trajectory for said workpiece treatment applicator to thereby apply the workpiece treatment to the workpiece along the determined trajectory.

24. A shoe component treating apparatus for treating a component of a shoe, the shoe component treating apparatus comprising:

a conveyor for conveying a shoe component along a predetermined path of travel;

a memory device for storing a plurality of predetermined parameters of each of a plurality of shoe components;

component identifying means responsive to said memory device for identifying a shoe component during travel along the predetermined path;

component treating means positioned adjacent said conveyor and responsive to said component identifying means for treating a shoe component being transported along the predetermined path of travel; and component treatment position determining means responsive to said component identifying means for continuously determining the position of said component treating means along a predetermined trajectory during treatment of the shoe component.

25. An apparatus as defined in claim 24, wherein said component identifying means comprises a video camera positioned to capture a visual image of a shoe component being conveyed by said conveyor and a vision processor responsive to said video camera for processing data representative of the visual image of the shoe component and comparing the visual image data to the plurality of predetermined parameters of at least one of the plurality of shoe components.

26. An apparatus as defined in claim 25, wherein said vision processor includes component position identifying means for identifying the orientational position of the shoe component being conveyed along the predetermined path of travel by said conveyor.

27. An apparatus as defined in claim 24, wherein said component treating means comprises a conveyor position processor responsive to said conveyor for processing data representative of the position of the shoe component along the predetermined path of travel, a component treating controller responsive to said conveyor position processor, said component identifying means, and said component treatment position determining means for controlling the treatment of the shoe component, and a component treatment applicator responsive to said component treating controller for applying a shoe component treatment to the shoe component.

28. An apparatus as defined in claim 24, wherein said component treatment position determining means comprises an optical emitter and an optical detector connected to a distal end of said component treatment applicator and responsive to said component treating controller for responsively monitoring the position of the distal end of said component treatment applicator during treatment of the shoe component.

29. An apparatus as defined in claim 27, wherein said component treating controller includes trajectory determining means responsive to said component identifying means for determining a treatment trajectory for said component treatment applicator to thereby apply the shoe component treatment to the shoe component along the determined trajectory.

30. A method of treating a workpiece, the method comprising:

transporting a workpiece along a predetermined path of travel;

identifying the workpiece during travel along the predetermined path;

treating the workpiece being transported along the predetermined path of travel; and continuously determining the position of a workpiece treatment applicator along a predetermined trajectory during treatment of the workpiece.

31. A method as defined in claim 30, wherein the step of identifying the workpiece includes the steps of capturing a visual image of the workpiece being transported, processing data representative of the visual image of the workpiece, and comparing the visual image data to a plurality of predetermined parameters of at least one of a plurality of workpieces.

32. A method as defined in claim 31, wherein the processing step includes identifying the orientational position of the workpiece being transported along the predetermined path of travel.

33. A method as defined in claim 30, wherein the step of determining the position of a workpiece applicator includes the step of sensing optical data from the workpiece being transported.

34. A method as defined in claim 30, wherein the step of treating the workpiece includes the step of processing data representative of the position of the workpiece being transported along the predetermined path of travel, controlling the treatment of the workpiece, and applying a workpiece treatment to the workpiece.

35. A method as defined in claim 34, wherein the step of controlling the treatment of the workpiece includes the step of determining a treatment trajectory for a workpiece treatment applicator to thereby apply the workpiece treatment to the workpiece along the determined trajectory.

36. A method of treating a shoe component, the method comprising:

identifying the shoe component responsive to a database of a plurality of shoe components;

applying an adhesive to a surface of the shoe component being transported along a predetermined path of travel; and continuously monitoring the position of an adhesive applicator along a predetermined trajectory during application of an adhesive to the shoe component.

37. A method as defined in claim 36, further comprising locating a shoe component with a camera during travel along a predetermined path and inspecting the shoe component during travel along the predetermined path.

38. A method as defined in claim 37, wherein the step of identifying the shoe component includes the steps of capturing a visual image of the shoe component being transported, processing data representative of the visual image of the shoe component, and comparing the visual image data to a plurality of predetermined parameters of at least one of a plurality of shoe components.

39. A method as defined in claim 38, wherein the processing step includes identifying the orientational position of the shoe component being transported along the predetermined path of travel.

40. A method as defined in claim 39, wherein the step of monitoring the position of the shoe component treatment applicator includes the steps of sensing optical data from the shoe component being transported and determining the position of the shoe component treatment applicator during treatment of the shoe component.

41. A method as defined in claim 40, wherein the step of applying adhesive to the shoe component includes the step of processing data representative of the position of the shoe component being transported along the predetermined path of travel and controlling the application of the adhesive to the shoe component.

42. A method as defined in claim 41, wherein the step of controlling the application of the adhesive to the shoe component includes the step of determining a treatment trajectory for the shoe component treatment applicator to thereby apply the adhesive to a surface of the shoe component along the determined trajectory.

43. A method of treating a workpiece, the method comprising:

identifying the workpiece during travel along a predetermined path;

treating the workpiece being transported along the predetermined path of travel; and continuously monitoring the position of a workpiece treatment applicator along a predetermined trajectory during treatment of the workpiece.

44. A method as defined in claim 43, wherein the step of identifying the workpiece includes the steps of capturing a visual image of the workpiece being transported, processing data representative of the visual image of the workpiece, and comparing the visual image data to a plurality of predetermined parameters of at least one of a plurality of workpieces.

45. A method as defined in claim 44, wherein the processing step includes identifying the orientational position of the workpiece being transported along the predetermined path of travel.

46. A method as defined in claim 45, wherein the step of monitoring the position of a workpiece applicator includes the steps of sensing optical data from the workpiece being transported and determining the position of the workpiece treatment applicator during treatment of the workpiece.

47. A method as defined in claim 46, wherein the step of treating the workpiece includes the step of processing data representative of the position of the workpiece being transported along the predetermined path of travel, controlling the treatment of the workpiece, and applying a workpiece treatment to the workpiece.

48. A method as defined in claim 47, wherein the step of controlling the treatment of the workpiece includes the step of determining a treatment trajectory for a workpiece treatment applicator to thereby apply the workpiece treatment to the workpiece along the determined trajectory.

49. A method of treating a workpiece, the method comprising:

applying a treatment to a workpiece by the use of a workpiece treatment applicator;

controlling the application of the treatment to the workpiece by the workpiece treatment applicator; and continuously determining the position of the workpiece treatment applicator along a predetermined trajectory during the application of the treatment of the workpiece.

50. A method as defined in claim 49, wherein the continuously determining step includes sensing the position of the workpiece treatment application by an optical sensor.

51. A method as defined in claim 49, wherein the controlling the application step includes determining a treatment trajectory for the workpiece treatment applicator to thereby apply the workpiece treatment to the workpiece along the determined trajectory.

* * * * *